(12) United States Patent
Tagawa (10) Patent No.: US 7,707,366 B2
(45) Date of Patent: Apr. 27, 2010

(54) MEMORY CONTROL DEVICE

(75) Inventor: Fumitake Tagawa, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 572 days.

(21) Appl. No.: 11/618,278

(22) Filed: Dec. 29, 2006

(65) Prior Publication Data

US 2007/0162715 A1 Jul. 12, 2007

(30) Foreign Application Priority Data

Jan. 6, 2006 (JP) .............................. 2006-001595

(51) Int. Cl.
*G06F 13/14* (2006.01)
(52) U.S. Cl. ........................... 711/154; 711/5; 711/105; 711/111; 712/22
(58) Field of Classification Search ................ 711/105, 711/5, 111, 154; 712/22; 365/193
See application file for complete search history.

(56) References Cited

U.S. PATENT DOCUMENTS

| 5,172,379 | A | | 12/1992 | Burrer et al. ................ 371/37.1 |
| 5,852,586 | A | * | 12/1998 | Fujita .......................... 365/193 |
| 6,233,656 | B1 | * | 5/2001 | Jones et al. .................. 711/137 |
| 2004/0193777 | A1 | * | 9/2004 | LaBerge ......................... 711/5 |
| 2005/0138326 | A1 | * | 6/2005 | Terada et al. .................. 712/22 |
| 2006/0212662 | A1 | * | 9/2006 | Ueda ........................... 711/147 |

* cited by examiner

*Primary Examiner*—Tuan V Thai
*Assistant Examiner*—Yong Choe
(74) *Attorney, Agent, or Firm*—Whitman Curtis Christofferso & Cook, PC (57) ABSTRACT

Improved efficiency of address/data communication over a memory bus. A memory-control device is located between a processor 30 and memory ranks 40a, 40b and controls access to the memory ranks 40a, 40b. A memory-management unit 10 receives and buffers access request from the processor 30 to memory ranks 40a, 40b, and issues access request to a rank-management unit 20 based on scheduling for memory management. A rank-management unit 20 connects the memory ranks 40a, 40b, receives and buffers access request from the memory-management unit 10, and gives access request to a specified memory rank based on scheduling for rank management.

12 Claims, 10 Drawing Sheets

MEMORY CONTROL DEVICE

FIELD OF THE INVENTION

This invention relates to a memory-control device, and particularly a technique for accessing a plurality of ranks or memory modules that are connected to the same memory bus.

BACKGROUND OF THE INVENTION

When a memory controller receives a memory access request from a processor, and inputs data to or outputs data from a memory such as a DRAM (Dynamic Random Access Memory), the row address and column address are specified, and the memory controller inputs data to or outputs data from the appropriate address. When doing this, it becomes necessary to have a wait time (minimum wait clock necessary for executing an instruction) during each instruction or until the data is actually input or output. This wait time includes a RAS (Row Address Strobe)-to-CAS (Column Address Strobe) delay and CAS latency (CL), and differs depending on the operating speed of the transistor and circuit configuration; also there is a tendency that as the operating frequency becomes higher, the necessary delay increases.

Figure 10:
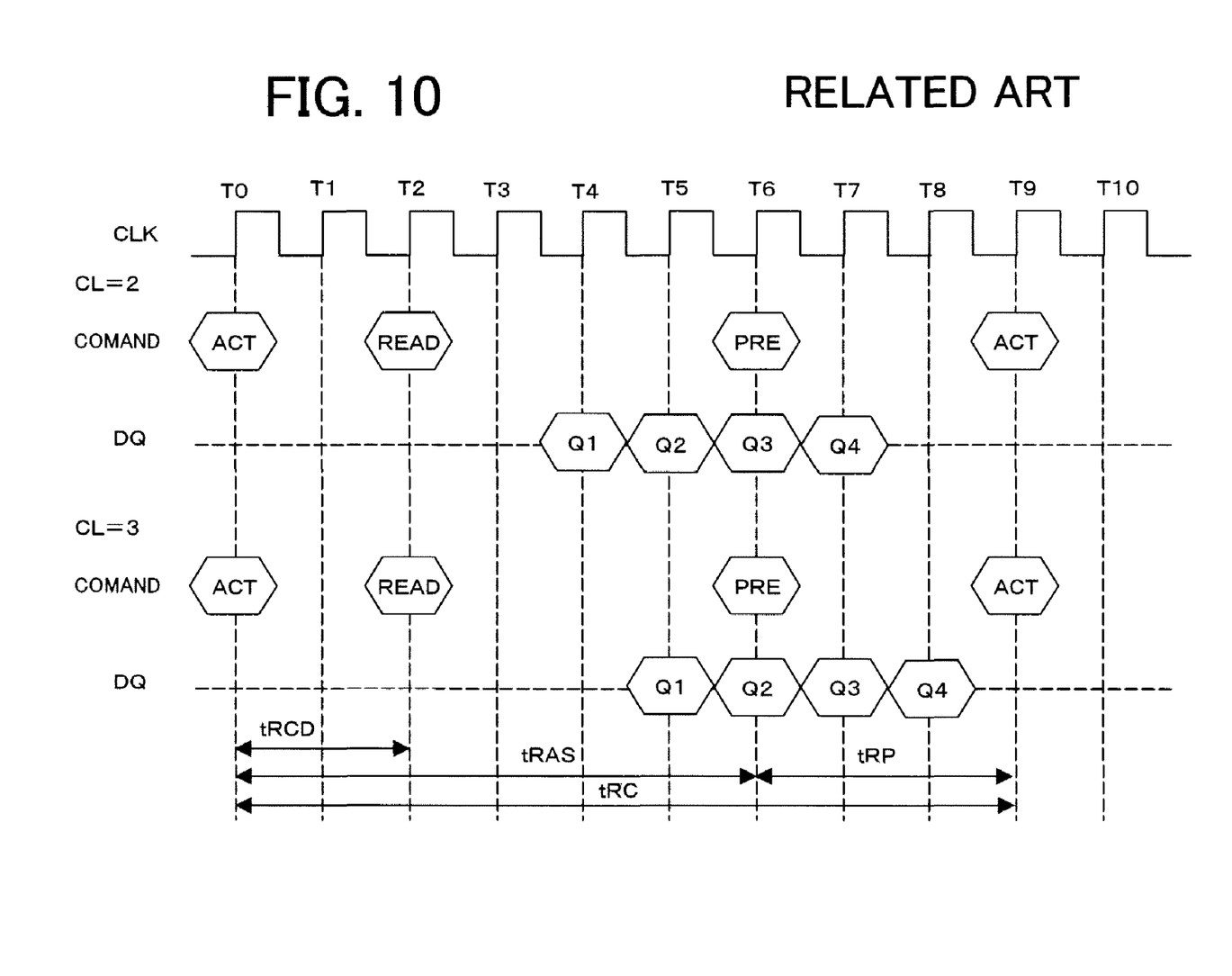
FIG. 10 is a drawing showing the timing for accessing a conventional typical DRAM memory, analyzed by the present inventor.

FIG. 10 is a drawing showing the timing for accessing a conventional DRAM memory. The figure shows the timing for 4-bit burst reading of an SDRAM in which tRCD (RAS-to-CAS Delay)=2, CL=2 or 3, and tRP (RAS pre-charge time)=3. An ACT instruction is issued at timing T0, and data is output according to a READ instruction at timing T2 (Q1 to Q4), then pre-charging is performed (PRE instruction) and 9 clocks (tRC) are necessary until ready for the next read instruction (ACT instruction at timing T9). The 5 clocks that do not include the time for actual output of the data cause the effective transfer rate of the memory bus being used to drop because of waiting.

Here, the construction of a memory module will be explained. The number of memory chips that can be mounted in a memory module is set to correspond with the width of the memory bus, and in the case of a 168-pin DIMM (Dual Inline Memory Module) having a 64-bit width, eight memory chips having word configuration×8 bits are grouped to form one rank, and normally the maximum capacity is 16 chips or 2 ranks on both sides. It is possible to switch between these two ranks using a 4-bit chip selection signal, and to specify the rank (memory chips) to be accessed for reading or writing.

When a plurality of ranks or memory modules is connected to a conventional single-channel memory bus, only one rank can be accessed at a time. All of the remaining ranks wait, and a recharge or refresh operation is also performed at the same time, which is inefficient.

As a method for improving the transfer rate, is a method that omits the RAS and CAS specification by burst transfer of a preset length of data stored in successive addresses, or a method that omits the RAS specification and specifies only CAS for successive data in the same RAS. These methods are effective for the input or output of successive data, however, they are not effective when the RAS changes or when performing random access.

Furthermore, as another method for improving the transfer rate is a well-known interleave-access method in which there are two or more memory-bus channels, and increases the transfer rate by alternately performing address mapping (see patent documents 1 and 2). The interleave-access method is also used by recent computer systems.

Also, a multi-bank-access-control device is known (see patent document 3) that controls access of a plurality of memory banks that is accessed from a plurality of processors or a plurality of threads.

[Patent Document 1]
Japanese Patent Kokai Publication No. JP-A-64-64045

[Patent Document 2]
Japanese Patent Kokai Publication No. JP-A-3-2943

[Patent Document 3]
Japanese Patent Kokai Publication No. JP-P2002-268942A

SUMMARY OF THE DISCLOSURE

In the interleave-access method, the amount of wiring for the address and data bus more than doubles, so the physical mounting space, such as the number of package terminals and board area, and the cost increases. Also, it is necessary to prepare memory modules of the same capacity corresponding with the number of channels. These mounting restrictions are particularly undesirable in a notebook PC in which there is a need to conserve space, or in an embedded system, so in many cases it is difficult to employ an interleave-access method.

On the other hand, in a multi-bank-access control method, it is prerequisite that interrupt instructions and input/output latency due to bus arbitration for the processor and each bank will increase, and that multi-threads will be created to make it appear as if there are a large number of logical CPUs as a technique for hiding the memory-access delay. Therefore, it becomes extremely complicated to achieve low-latency memory access with high throughput.

Also, there is a problem unique to DRAM that it is necessary to periodically perform a refresh, and it is not possible to input or output data while the refresh is being performed. This greatly affects the effective memory access rate.

Therefore, a memory-control device having simple construction and that is capable of increasing the bus utilization efficiency and making it possible for low-latency memory access with high throughput has been desired, however, it is difficult to accomplish this with the prior art.

In the light of the aforementioned problem, the present inventor thought that aiming at high-throughput low-latency memory access even on one bus would be good for overall efficiency. Therefore the present inventor has invented a memory-control device that improves the address/data communication efficiency when a plurality of ranks or modules are mounted on one bus.

According to an aspect of the present invention, there is provided a memory-control device that is located between a processor and a plurality of memory ranks, and controls access to the memory ranks. The memory-control device comprises: a memory-management unit that receives and buffers an access request from the processor to any of the memory ranks, and issues access request to a rank-management unit based on scheduling for memory management; and a rank-management unit that connects the plurality of memory ranks, receives and buffers the access request from the memory-management unit, and gives the access request to any one concerned of the memory ranks based on scheduling for rank management.

In a first form of the memory-control device, the memory-management unit can comprise: a first counter that performs counting for data busses that are connected with the rank-management unit, and counts the time from occupation start of a data bus used for execution of an access request to end of the occupation; and a first controller that performs the scheduling for memory management according to contents of the first counter; and the said rank-management unit comprises: a second counter that counts the time from occupation start of a data bus used for execution of an access request to end of the occupation; and a second controller that performs the scheduling for rank management according to contents of the second counter.

In a second form of the memory-control device, the memory-management unit can further comprise a command decoder that corresponds to each of the plurality of memory ranks, the command decoder executes the access request by identifying the access request for a memory rank concerned by a chip-selection signal; and the second controller determines timing for data input/output for a memory rank concerned by finding an available timing of the data bus through counting by the second counter, the number of clocks that correspond to the time from occupation start of the data bus used for executing an instruction starts to end of the occupation, the instruction being directed to ones other than the memory rank concerned.

In a third form of the memory-control device, the memory-management unit can further comprise a third counter that counts the time during which each of the memory ranks of the plurality of memory ranks is busy; and the first controller performs the scheduling for memory management according to contents of the third counter.

In a fourth form of the memory-control device, the rank-management unit can comprise a fourth counter that counts the time during which any of the memory ranks that are connected to the rank-management unit is busy; and the second controller performs the scheduling for rank management according to contents of the fourth counter.

In a fifth form of the memory-control device, the memory-management unit can further comprise an address-conversion table for re-arranging the order of serial access in the address space of the processor so that interleave access of the plurality of memory ranks is performed.

In a sixth form of the memory-control device, the rank-management unit can further comprise a data buffer that stores burst data of which a length of at least one word has been added to the word length when performing multi-word burst access, and when an instruction that corresponds to multi-word burst comes from the memory-management unit, the extra one-word portion is pre-fetched to the data buffer.

In a seventh form of the memory-control device, the rank-management unit can pre-fetch one-word length of burst data from the first CAS (Column Address Strobe) address that follows the next continuing RAS (Row Address Strobe) address when a read instruction comes to read the last CAS address of the same RAS.

In an eighth form of the memory-control device, the rank-management unit can output data that was pre-read with no wait to the data bus and execute receiving of the next command when the pre-read data pre-fetched to the data buffer hit the address of the next read instruction, and discard the pre-read data when pre-read data that was pre-fetched in the command buffer miss-hit the next read instruction.

In a ninth form of the memory-control device, the memory-management unit can further comprise: an access-request segregator (determinator) that segregates (determines) instructions from the processor into read instruction and write instruction; a read-request buffer that buffers the segregated read instructions; and a write-request buffer that buffers the segregated write instruction; and when the read instruction and the write instruction are buffered in the respective read-access buffer and write-request buffer, gives priority to issue a read instruction to the rank-management unit.

In a tenth form of the memory-control device, the rank-management unit transfers a write instruction for rank memory that is connected to the rank-management unit and data related to that write instruction to a decoder buffer and data buffer, respectively, while the rank memory that is an object of the read instruction is being read, and executes that write instruction when the rank memory that is the object of that write instruction differs from the rank memory that is the object of the read instruction.

In an eleventh form of the memory-control device, the memory-management unit receives a write instruction from the processor at the same time as write data related to that write instruction.

In a twelfth form of the memory-control device, the rank-management unit performs a refresh operation of a rank memory at timing when the data bus is busy with communication with a rank memory other than that rank memory.

The meritorious effects of the present invention are summarized as follows.

With the present invention, commands and data flow continuously over the main memory bus, and it is possible to dramatically improve the bus utilization efficiency. The first reason for this is that it is not necessary to take into consideration the actual memory access latency for instructions issued by the memory-management unit. The second reason is that the time difference of usage of the data bus used for read instructions and write instructions is utilized, and instructions are rearranged with read instructions having priority. The third reason is that the rank-management unit and every memory rank are independent, and different instructions can be executed in parallel in the respective memory ranks, and rank interleave is performed according to an address-conversion table, so the clock related to address specified delay or pre-charge etc. is hidden, making it possible to perform data input/output at high speed.

Moreover, with this invention, by using read pre-fetch and an ACT instruction with data, it is possible to reduce the read/write time. The reason for that is that a one-word portion of the address continuing after a read instruction that was given to the command decoder is pre-fetched by the data buffer, and when it matches the next read instruction, it is possible to perform output at high speed. Also, data of a write instruction in the data buffer is constantly monitored, so data is saved and written in a memory rank even when data is output from an ACT instruction that is one clock preceding to the write instruction.

PREFERRED EXAMPLES OF THE INVENTION

Figure 1:
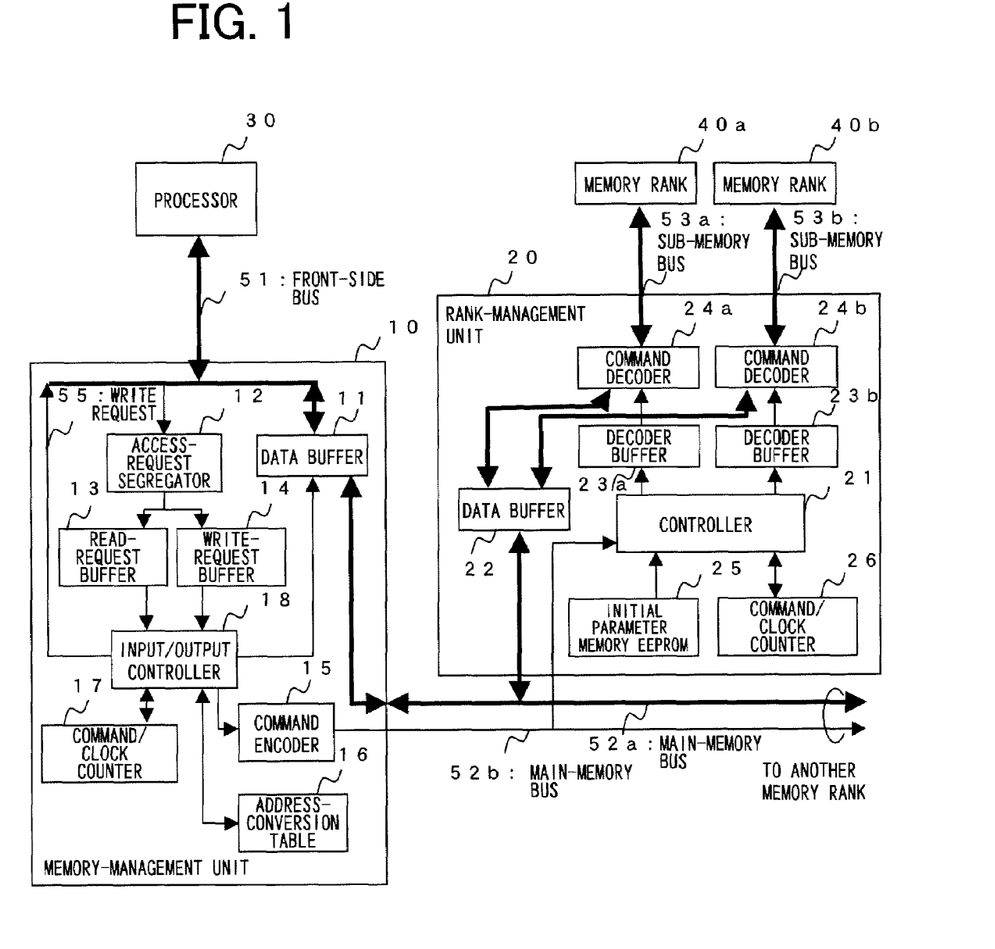
FIG. 1 is a block diagram showing the construction of a memory-control device of an example of the present invention.

FIG. 1 is a block drawing showing the construction of the memory-control device of an example of the present invention. In FIG. 1, the memory-control device comprises: a memory-management unit 10 that is connected to a processor 30 via a front-side bus 51; and a rank-management unit 20 that connects to memory ranks 40a, 40b via sub-memory buses 53a, 53b, respectively. The memory-management unit 10 connects to the rank-management unit 20 in memory-module units or rank units via the main memory buses 52a, 52b without directly connecting to the memory ranks 40a, 40b. Here, main memory bus 52a is a bus that transmits data, and main memory bus 52b is a bus that transmits instructions (commands) and addresses. In FIG. 1, an example of a stub connection is shown, however, the connection could also be a tree-type, daisy chain, etc. Also, two memory ranks are shown, however, needless to say, three or more memory ranks could be used. Furthermore, only one memory-management unit is shown in the example, however, two or more could also be used.

The memory-management unit 10 comprises: a data buffer 11, an access-request segregator (discriminator) 12, read-request buffer 13, write-request buffer 14, command encoder 15, address-conversion table 16, command/clock counter 17, and input/output controller 18. The data buffer 11 buffers the write data that is output from the processor 30 via a front-side bus 51, and outputs that write data to the main memory bus 52a according to control from the input/output controller 18. Also, the data buffer 11 buffers data that is received from the main memory bus 52a according to control from the input/output controller 18, and outputs that data to the processor 30 via a front-side bus 51. The access-request segregator 12 receives instructions that are output from the processor 30 via the front-side bus 51, and when the received instruction is a read instruction, outputs the instruction to the read-request buffer 13, and when the received instruction is a write instruction, outputs the instruction to the write-request buffer 14. The read-request buffer 13 buffers the read instruction, and outputs it to the input/output controller 18. Also, the write-request buffer 14 buffers the write instruction, and outputs it to the input/output controller 18.

The input/output controller 18 references the contents of the address-conversion table 16 and command/clock counter 17, adjusts the output timing and schedules output, then outputs the received read instruction or write instruction to the command encoder 15. In the case of a write instruction, outputs a write request 55 to the processor 30 via the front-side bus 51. The address-conversion table comprises data for rearranging the address map. The command/clock counter 17 comprises a counter that counts when the main memory bus 52a is busy, and a counter that counts when the memory rank is busy due to refresh or the like. The command encoder 15 outputs instruction(s) that is (are) output from the input/output controller 18 to the main memory bus 52b. The command encoder 15 may also add error-correcting code (ECC) when outputting an instruction.

On the other hand, the rank-management unit 20 comprises: a controller 21, data buffer 22, decoder buffers 23a, 23b, command decoders 24a, 24b, initial-parameter-memory EEPROM 25, and command/clock counter 26. The controller 21 decodes the instruction that is sent via the main memory bus 52b, references the contents of the initial-parameter-memory EEPROM 25 and command/clock counter 26 and schedules the output timing, then outputs the instruction to the decoder buffer 23a (23b). When the command encoder 15 adds error-correcting code the controller 21 also comprises a function for decoding the corresponding error-correcting code. The data buffer 22 buffers the data that is sent via the main memory bus 52a, and outputs it to the command decoder 24a (24b). Also, the data buffer 22 buffers data that is output from the command decoder 24a (24b), and outputs it to the main memory bus 52a. Based on an instruction that is output from the decoder buffer 23a, the command decoder 24a outputs the data that is buffered in the data buffer 22 to a memory rank 40a via a sub-memory bus 53a; or outputs data that is output from the memory rank 40a via the sub-memory bus 53a to the data buffer 22. Based on an instruction that is output from the decoder buffer 23b, the command decoder 24b outputs the data that is buffered in the data buffer 22 to a memory rank 40b via a sub-memory bus 53b; or outputs data that is output from the memory rank 40b via the sub-memory bus 53b to the data buffer 22.

The desired effect is obtained by mounting two or more rank memories (memory modules) in this way. It is also possible to employ a multi-channel method that has a plurality of main memory busses. Moreover, since it is possible for the main memory busses 52a, 52b to be electrically and logically compatible, they can be used even for non-corresponding modules, which is convenient and preferred.

When a conventional memory is used, a command-decoder chip can be mounted externally, and in the case of new development, from the aspect of performance such as lowering mounting cost and latency, it is possible to mount a memory chip itself.

The main memory bus between the memory-management unit 10 and the controller 21, and the sub-memory buses from the command decoders 24a, 24b to the memory ranks 40a, 40b are synchronized according to the clock, however are independent busses. Also, the main memory bus and sub-memory bus may be same with or different from each other in the speed, bus protocol and electrical characteristics.

In transmission of commands and addresses on the main memory bus, the time allowed for detecting signals becomes shorter than in the conventional art, so it is necessary that the commands and addresses be transmitted reliably. Therefore, it is preferred that the time during which the steady state is stable be maintained by decreasing the differential signal amplitude (potential difference), and quickly completing the switching to low level or high level. Also, it is possible to add parity or error-correcting code (ECC) to only command and address signals and to reliably transmit instructions on the main memory bus.

In communication of commands and data among the controller 21, data buffer 22, command decoders 24a, 24b and each rank, in order to avoid conflict in the input or output of data due to clock skew or delay, it is preferred that the clock skew and delay of the main memory busses 52a, 52b be measured, and that the wait time be adjusted beforehand. Furthermore, in order to reflect the changes in delay due to the effects of operating temperature, construction can be such that measurement is performed and the wait time is adjusted in a timely manner. Also, it is preferred that construction be such that the difference in arrival times of signals be alleviated as much as possible by equal wiring length, minute differential signal, terminating resistance calibration, etc.

The major functions of a memory-control device with this kind of construction are as follows:

1. A rank independent function that receives instructions independently in memory rank units.
2. A rank interleave function that increases the speed by alternating operation of a plurality of ranks according to location in the address map.
3. A pre-fetch read function that when reading continuous addresses in the same rank reads the start of the next column address (CAS) or next row address (RAS) beforehand, even when there is no instruction.
4. An ACT with data instruction function that distributes also data at the same time as an ACT instruction preceding to a memory-write instruction, and improves efficiency by reducing the number of required clocks.
5. A continuous instruction function that issues instructions without taking into consideration the wait actually required by memory element(s), and changes to the actual access method just before the memory chip.
6. A function that performs bus arbitration without using interrupts, i.e., wherein there is a command/clock counter independent of the memory-management unit and rank-management unit, and backward counting is performed from a given or received instruction, incrementing the BUSY clock of the data bus required for reading or writing.
7. A function of using a chip-selection signal to identify the command decoder and to give instructions.
8. An ECC function that transmits instruction commands/address information to the command decoder at high speed without error. This is added as necessary.

First, the rank-independent function will be explained. Each memory rank 40a, 40b is connected to the rank-management unit 20 via independent sub-memory busses 53a, 53b, respectively. Therefore, it is possible to simultaneously execute different instruction operations for each memory rank. By doing this, the main memory busses 52a, 52b between the memory-management unit 10 and rank-management unit 20 are capable of transmitting instructions, addresses and data without adding access latency.

Instructions from the main memory bus 52a are transmitted to each of the command decoders 24a, 24b at the same time because all of the ranks are connected using stub connection. When selecting a rank, a conventional memory-chip chip-selection signal is used. The instructions are taken in by all of the decoder buffers 23a, 23b of the rank-management unit 20, and segregated into instructions for its own command decoder and instructions for other than its own command decoder.

In the case of instructions for its own command decoder, the command decoder adds actual memory-chip latency, and issues instructions to the sub-memory bus 53a (53b), then performs data input/output to the memory rank 40a (40b). In the case of a write instruction, write data is given at the same time as an instruction from the controller 21, and stored in the data buffer 22 that is located in conjunction with the command decoder 24a (24b), and according to a given access timing, such as the latency proper to the memory chip, is sent to the memory rank. In the case of a read instruction, read data is stored in the data buffer 22 after an instruction is given to the memory rank 40a (40b) and after specified latency, and it waits there to be output to the main memory bus 52a.

In the case of instructions that are not for the command decoder, the command decoder ignores instructions for other ranks, however, counts backward from the instruction to get a grasp of the timing of the busy state of the data bus.

In the case of a received read instruction, when preparation of the data buffer 22 for read data is complete, data is sent to the main memory bus 52a at the shortest available timing (i.e., a timing with the shortest vacancy) according to the data-bus-busy-schedule record that is recorded in the command/clock counter 26. In this case, scheduling is performed for other rank-management units according to the data-bus-busy-schedule record, so conflicts do not occur for use of the main memory bus 52a.

In the rank-interleave function, when storing data in the memory ranks 40a, 40b, data for one word, which is a burst length having the highest data-output efficiency, or a data length in continuous CAS in the same RAS, which is taken to be the minimum unit, it is divided into divisions so that interleave access can be performed, then placed in addresses and recorded in an address-conversion table 16. In the case of giving read/write instructions, input or output to a database becomes continuous even when separated in order to give instructions to each rank without adding the latency that is required for the actual memory chip.

Figure 2A:
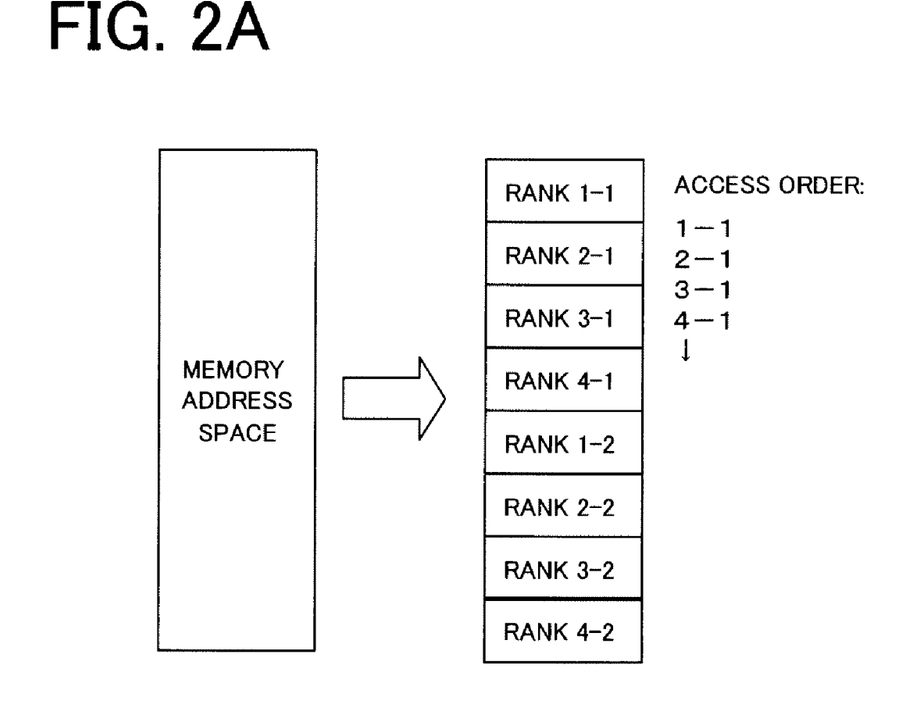
FIGS. 2A and 2B are drawings for explaining the rearrangement of an address map by an address-conversion table.
Figure 2B:
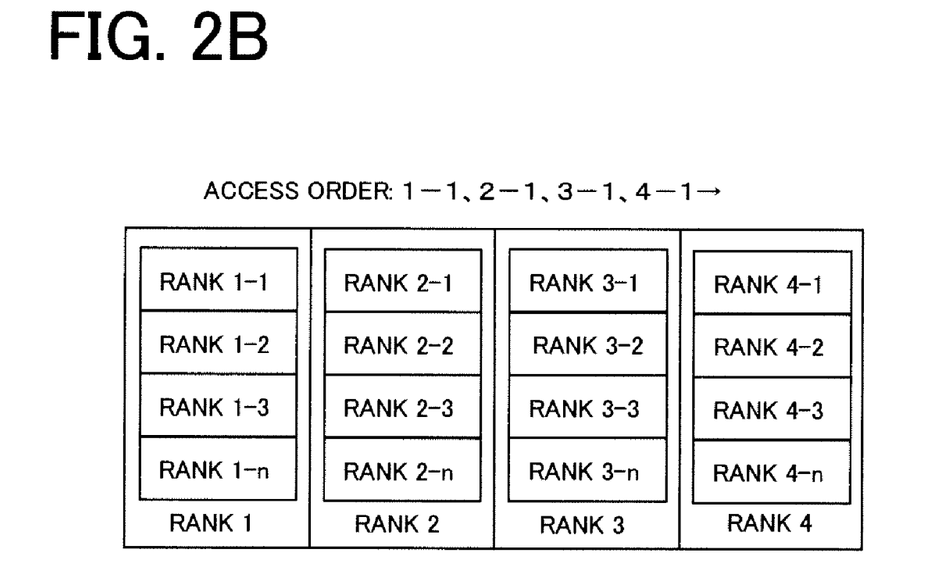

The address-conversion table 16 is a table for performing rearrangement of the address map as shown in FIGS. 2A and 2B. With this table, the memory-address space, which is the logical address map of the processor 30, is rearranged, for example, in the order of access (1-1, 2-1, . . . ) as shown in FIG. 2A, such as ranks 1-1 to ranks 4-2. The rearranged memory-address map becomes a physical address map that is divided into rank units as shown in FIG. 2B. The physical address map is spatially divided, so it is possible to increase the access speed by hiding the latency in reading or writing and without access concentrating on one rank.

Next, the pre-fetch read function will be explained. The data buffer 22 of each rank-management unit 20 is divided into cache-memory divisions of one-word portions or greater, and for a received instruction a one-word portion of data (pre-fetch data) that corresponds to the next successive address is pre fetched.

On the side of the memory-management unit 10, the command/clock counter 17 is referenced and knows beforehand when and address is the next continuing address. Therefore, when it is determined as cache hit, it is possible to output data from the data buffer to the main memory bus 52a without adding the latency that would be inherently generated until data is read from the command decoder 24a (24b) to the memory rank 40a (40b) according to a read instruction.

In the case of giving a read instruction for reading this pre-fetched data, a read pre-fetch instruction is newly defined and issued to the rank-management unit 20. This makes it clear that the instruction is a read instruction with less latency than normal, and notifies a command decoder in another rank that the timing at which the data buffer will become busy will occur sooner. By doing this, it is possible to omit the wait time that corresponds to the sum of the RAS-to-CAS delay and CAS latency. Also, it is possible to use the bandwidth of an available memory bus (ones that has become vacant so) in order to accelerate execution of the next address read instruction.

When a read instruction from the controller 21 is the last CAS address of the same RAS, one word portion of data of the CAS at the start of the next continuing RAS is automatically pre fetched. By doing so, it becomes possible to output data at high speed without fluctuation in latency even in the case of a different RAS when burst transfer is not normally possible.

In the case that a read/write instruction of a non-continuing address arrives before a pre-fetch operation is complete, or during a pre-fetch operation, the read-write operation is executed without the pre-fetch operation being executed. In the case where a read/wire instruction is given during a pre-fetch operation, the pre-fetch burst operation stops. Also, in the case where a read instruction of a non-continuing address arrives after a pre-fetch operation is complete, it is determined to be a miss hit, and the contents of the data buffer 22 that correspond to the cache are cleared, after which the next data is read as normal, while at the same time one-word portion of the following data is pre-fetched and stored.

The memory-management unit 10 comprises a command/clock counter 17 that will be explained later, and the memory-rank controller 21 comprises a command/clock counter 26 that will also be explained later. Also, the memory-management unit 10 counts the number of clocks under use by the data buffer 22 or other rank running on the data bus, which is the main memory bus 52a, or the number of clocks scheduled to use the main memory bus 52a, and has a bus adjustment mechanism that suppresses access by its own rank during that period.

Next, the operation of the memory-control device will be explained in detail. First, the processor 30 issues read or write commands to the memory-management unit 10 via the front-side bus for reading from or writing to memory. The commands and addresses are segregated into read command(s) or write command(s) by the access-request segregator 12, and stored in the read-request buffer 13 and write-request buffer 14. In the case of a write instruction, the instruction is temporarily stored in the data buffer 11, and then the processor is notified that operation is complete (writeback operation).

The input/output controller 18 sets the order for issuing instructions based on a flowchart such as will be explained below, and sets output rank destination according to the contents of the address-conversion table 16. Also, the input/output controller 18 gives an instruction to the command encoder 5 and records the schedule for when the data bus will be busy in the command/clock counter 17.

Figure 3:
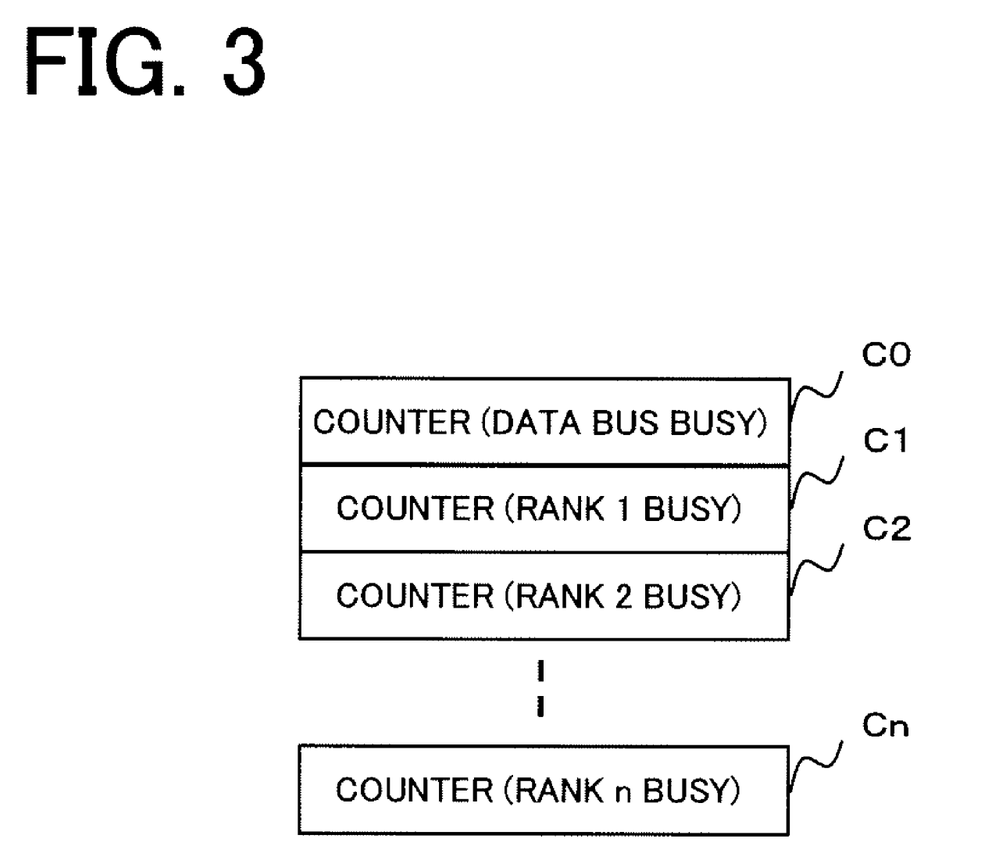
FIG. 3 is a drawing showing the construction of the command/clock counter on the side of the memory-management unit.

Moreover, as shown in FIG. 3, the command/clock counter 17 comprises a counter C0 that counts when the data bus is busy, and counters C1 to Cn that count when each respective rank is busy due to refresh or the like. Counter C0 is incremented by a read instruction or write instruction that is issued for each rank. Counters C1 to Cn are incremented when there is a refresh of the respective rank. Also, the counters C0 to Cn are decremented each time 1 clock elapses. By checking the counter C0 for each clock, the input/output controller 18 can confirm whether or not the data bus is busy. Also, by checking the counters C1 to Cn at each clock, the input/output controller 18 can confirm whether or not the respective ranks are busy.

Figure 4:
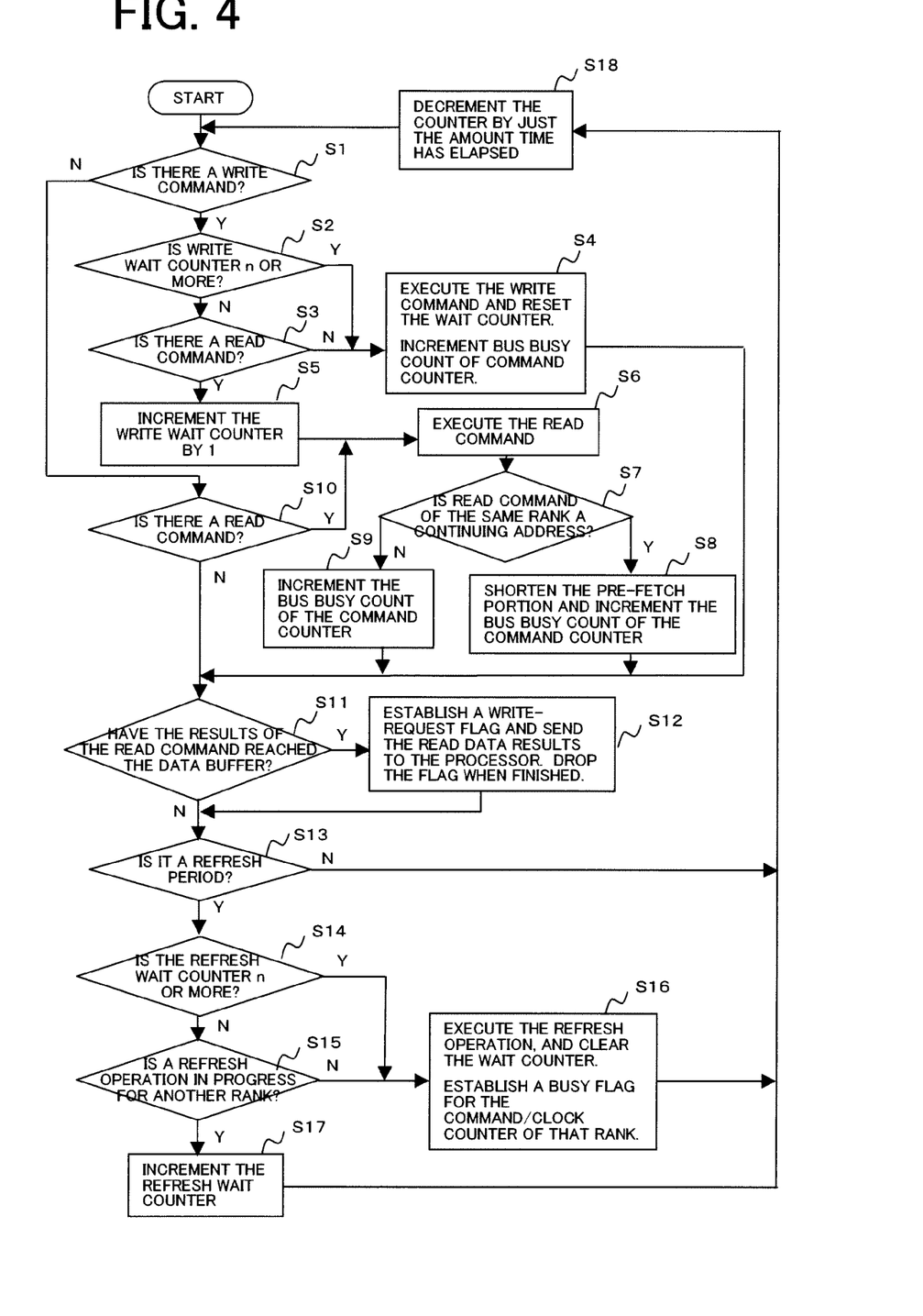
FIG. 4 is a flowchart showing the operation of the controller on the side of the memory-management unit.

Next, the operation of the input/output controller 8 will be explained. FIG. 4 is a flowchart showing the operation of the input/output controller 18.

In step S1, the input/output controller 18 determines whether or not there is a write command in the write-request buffer 14, and when there is a write command, it advances to step S2, however, when there is no write command, it advances to step S10.

In step S2, the input/output controller 18 determines whether or not the write wait counter is n or more, and when it is n or more, it advances to step S4, and when it is less than n, it advances to step S3.

In step S3, the input/output controller 18 determines whether or not there is a read command in the read-request buffer 14, and when there is a read command, it advances to step S5, and when there is no read command, it advances to step S4.

In step S4, the input/output controller 18 executes the write command and resets the write wait counter. Furthermore, it increments the value of the bus-busy counter (value of counter C0) in the command counter 17, after which it advances to step S11.

In step S5, the input/output controller 18 increments the write wait counter and advances to step S6.

In step S6, the input/output controller 18 executes the read command and advances to step S7.

In step S7, the input/output controller 18 determines whether or not the read command in the same rank is a continuing address, and when it is a continuing address, advances to step S8, and when it is not a continuing address, advances to step S9.

In step S8, the input/output controller 18 shortens the pre-fetch portion and increments the value of the counter C0, then advances to step S11.

In step S9, the input/output controller 18 increments the value of the counter C0 and advances to step S11.

In step S10, the input/output controller 18 determines whether or not there is a read command in the read-request buffer 13, and when there is a read command, it advances to step S6, and when there is no read command, it advances to step S11.

In step S11, the input/output controller 18 determines whether or not the read command has reached the data buffer 22, and when the command has reached the data buffer 22, it advances to step S12, however, when the command has not reached the data buffer 22, it advances to step S13.

In step S12, the input/output controller 18 establishes a write-request flag and sends the results of the read data to the processor 30, after which it drops the write-request flag and advances to step S13.

In step S13, the input/output controller 18 determines whether or not it is a refresh period, and when it is a refresh period, it advances to step S14, however, when it is not a refresh period, it advances to step S18.

In step S14, the input/output controller 18 determines whether or not the refresh-wait counter (one of the counters C1 to Cn) is n or more, and when the counter is n or more, it advances to step S16, however, when the counter is less than n, it advances to step S15.

In step S15, the input/output controller 18 determines whether or not the refresh operation of another rank is in progress, and when the refresh operation is in progress, it advances to step S17, other wise it advances to step S16.

In step S16, the input/output controller 18 executes a refresh, after which it clears the refresh-wait counter. Also, the input/output controller 18 establishes a busy flag for the command/clock counter of that rank and advances to step S18.

In step S17, the input/output controller 18 increments the refresh-wait counter, and advances to step S18.

In step S18, the input/output controller 18 decrements the command/clock counter by just the amount of the elapsed time, after which it returns to step S1.

After referencing the contents of the command/clock counter, instructions and data are sent at timing when the main memory busses 52a, 52b are available (i.e., not busy), and sent to all of the rank-management units 20 that are connected to the main-memory busses. Of these, addresses and commands are sent to the controller 21 via the main memory bus 52b, and data is sent to the data buffer 22 via the main memory bus 52a.

The controller 21 determines the contents of an instruction according to the flowchart that will be explained below, and when it determines from the chip-selection signal that it is an instruction for its own rank, it immediately sends the instruction to a decoder buffer 23a or 23b. When the instruction is for a rank other than that rank, it discards that instruction and data. Also, the controller 21 checks for errors by performing comparison of the ECC, increments the command/clock counter 26 according to the instruction for its own rank, and determines the busy status of the data bus and its own rank.

Figure 5:
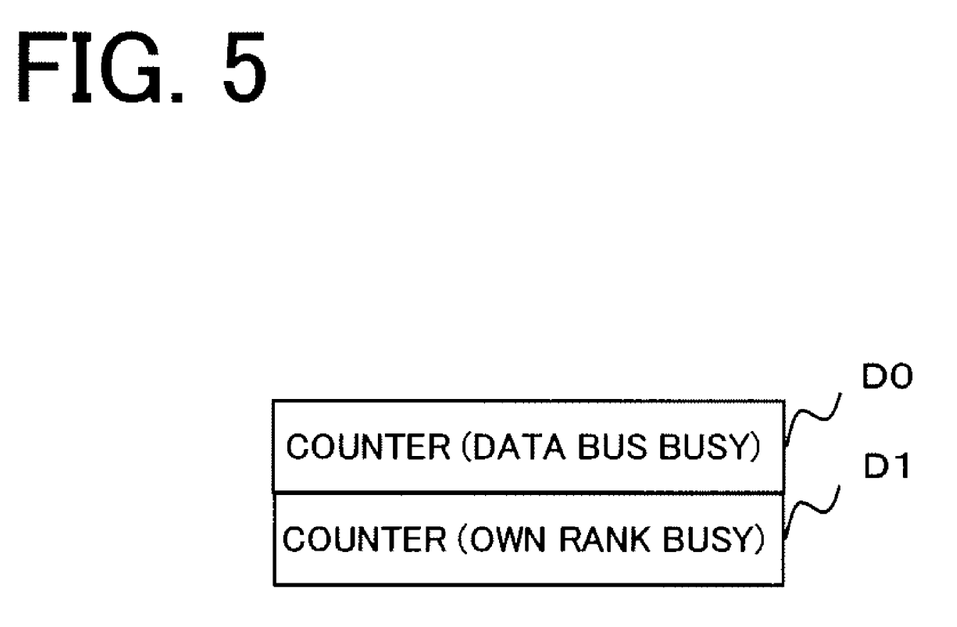
FIG. 5 is a drawing showing the construction of the command/clock counter on the side of the rank-management unit.

Also, as shown in FIG. 5, the command/clock counter 26 comprises a counter D0 that counts when the data bus is busy, and a counter D1 that counts when the rank is busy due to a refresh or the like. The counter D0 is incremented by a read instruction or write instruction that is issued to its own rank or to another rank. The counter D1 is incremented by a refresh for its own rank. Also, the counters D0 to D1 are decremented each time 1 clock elapses. The controller 21 is able to confirm whether or not the data bus is busy by checking the counter D0 at each clock. Also, the controller 21 is able to confirm whether or not its own rank is busy by checking the counter D1 at each clock.

Figure 6:
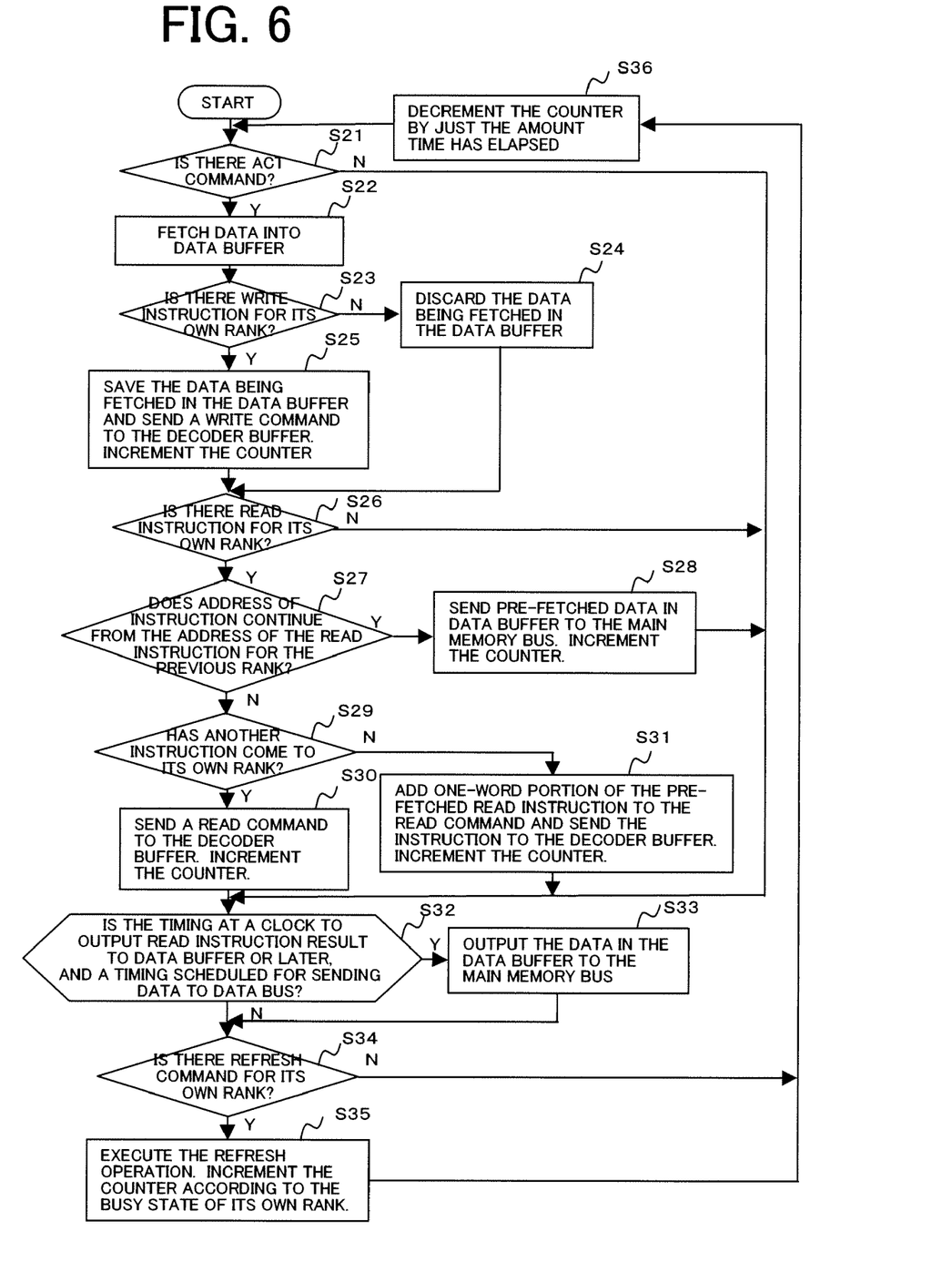
FIG. 6 is a flowchart showing the operation of the controller on the side of the rank-management unit.

Next, the operation of the controller 21 will be explained. FIG. 6 is a flowchart showing the operation of the controller 21.

In step S21, the controller 21 determines whether or not the instruction is an ACR command, and when the instruction is an ACT command, it advances to step S22, however, when the instruction is not an ACT command, it advances to step S23.

In step S22, the controller 21 fetches data into the data buffer 22 and then advances to step S23.

In step S23, the controller 21 determines whether or not the instruction is a write instruction for its own rank, and when the instruction is a write instruction for its own rank, the controller 21 advances to step S25, otherwise it advances to step S24.

In step S24, the controller 21 discards the data that is being fetched into the data buffer 22 and advances to step S26.

In step S25, the controller 21 saves the data being fetched in the data buffer 22 and writes the write instruction in the decoder buffer, then increments the counter D0 and advances to step S26.

In step S26, the controller 21 determines whether or not the instruction is a read instruction for its own rank, and when the instruction is a read instruction for its own rank, the controller 21 advances to step S27, otherwise it advances to step S32.

In step S27, the controller 21 determines whether or not the read instruction is for an address that continues from the previous read instruction for its own rank, and when the instruction is for a continuing address, the controller 21 advances to step S28, otherwise it advances to step S29.

In step S28, the controller 21 sends the pre-fetched data in the data buffer 22 to the main memory bus. Also, the controller 21 increments the counter D0 and advances to step S32.

In step S29, the controller 21 determines whether or not another instruction has come to its own rank, and when an instruction has come, the controller 21 advances to step S30, otherwise it advances to step S31.

In step S30, the controller 21 sends an instruction to read the decoder buffer 23a (23b), then increments the counter D0 and advances to step S32.

In step S31, the controller 21 adds the one-word portion of the pre-fetched read instruction and sends the instruction to the decoder buffer 23a (23b). Also, the controller 21 increments the counter D0 and advances to step S32.

In step S32, the controller 21 determines whether or not the timing is a time for outputting the result of the read instruction or later, and whether the timing is that scheduled for the data bus, and when the timing is the time for outputting the read instructions or later and is the scheduled timing, the controller 21 advances to step S33, otherwise it advances to step S34.

In step S33, the controller 21 outputs data from the data buffer 22 to the main memory bus, then advances to step S34.

In step S34, the controller 21 determines whether or not there is a refresh command for its own rank, and when there is a refresh command for its own rank, the controller 21 advances to step S35, otherwise it advances to step S36.

In step S35, the controller 21 executes a refresh, and increments the counter D1 according to the busy state of its own rank, and advances to step S36.

In step S36, the controller 21 decrements the counters D0, D1 by the amount of just the elapsed time, and then returns to step S21.

At start up, the controller 21 reads the contents of the initial-parameter-memory EEPROM 25 in which the memory elements that are mounted in the memory rank and their speed grades are recorded, and notifies the memory-management unit 10.

The decoder buffer 23a (23b) sends instructions to the command decoder 24a (24b). Furthermore, the command decoder 24a (24b) add the access time and necessary delay for the memory rank 40a (40b) in which the actual memory is mounted, and issues instructions to the sub-memory bus 53a (53b). When doing this, the command decoder 24a (24b) is not able to process instructions at each clock, so the instructions are stored in the decoder buffer 23a (23b) and processed using FIFO (First-In-First-Out) until they are executed.

When reading, the results are stored in the data buffer 22, and sent to the memory-management unit 10 via the main memory bus 52a according to the data bus schedule that was incremented by the command/clock counter 26. The data is stored in the data buffer 11, and after a write request 55 is output, it is then sent to the processor 30.

In the memory-control device as described above, when viewed from the aspect of one access unit, effects are not apparently seen, however, the information density of the commands and data that flow over the main memory busses 52a, 52b is increased. This will be explained with a timing chart using an example of a read instruction.

Figure 7:
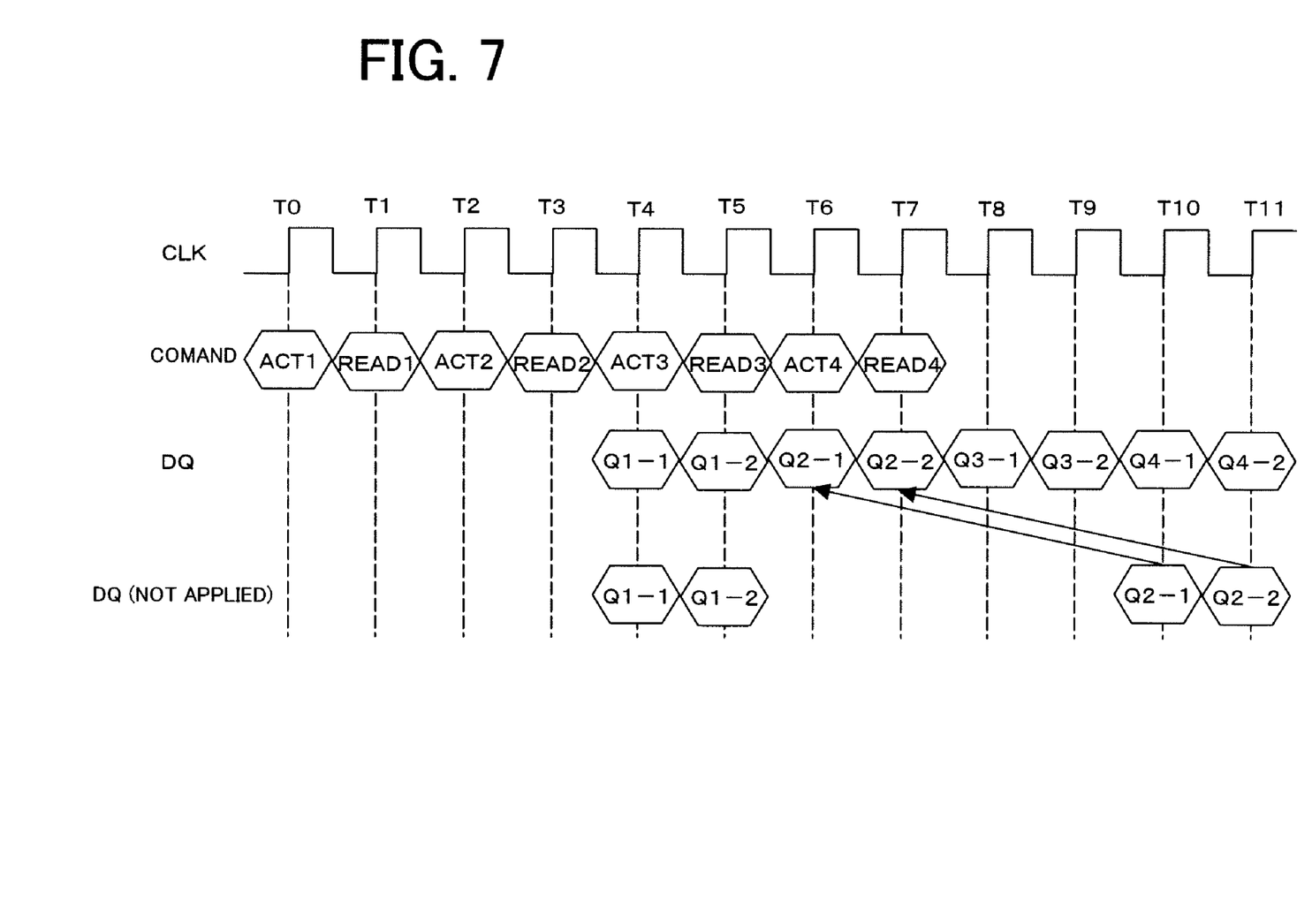
FIG. 7 is a drawing showing the operation timing by issuing of a continuation instruction and rank interleaving.

FIG. 7 is a drawing showing the operation timing when continuous instruction are issued and rank interleaving is performed. Here, the case in which the burst length is 2 is shown. With the memory-control device of this example, it is possible to issue four continuous ACT instructions and four continuous READ instructions at timing T0 to T7, for example. The read data for the READ instructions is continuously output with a 4-clock delay as in Q1-1 to Q4-2. On the other hand, with a conventional memory-control device, after one ACT instruction, the read data for the READ instruction is output with a 4-clock delay. However, it is not possible to continuously issue ACT instructions and READ instructions, and there is a delay due to pre-charge or latency, and since the ACT instruction is issued at timing T6, the next time that read data can be output is not until timing T10.

Figure 8:
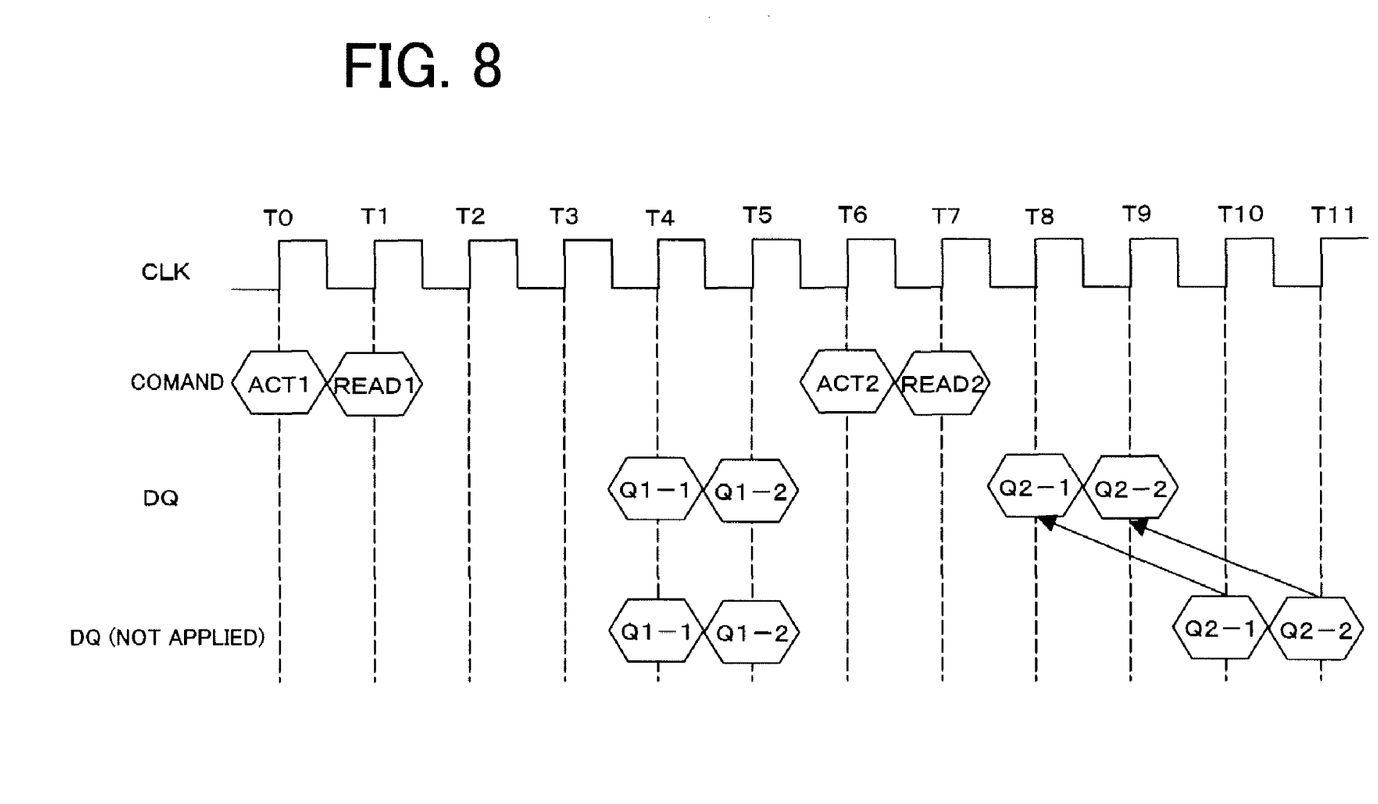
FIG. 8 is a drawing showing the operation timing by pre-fetch reading.

Also, FIG. 8 is a drawing showing the operation timing for a pre-fetch read. Here as well, the case in which the burst length is 2 is shown. With the memory-control device of this example, the address following the first READ instruction is pre-fetched and saved in the data buffer 22. When the next READ instruction continues after this address, the read data is output from the data buffer 22, so it is possible to read the data at high speed (at 2-clock delay). On the other hand, with a conventional memory-control device, after the ACT instruction, read data that is for the READ instruction is output after a 4-clock delay.

Figure 9:
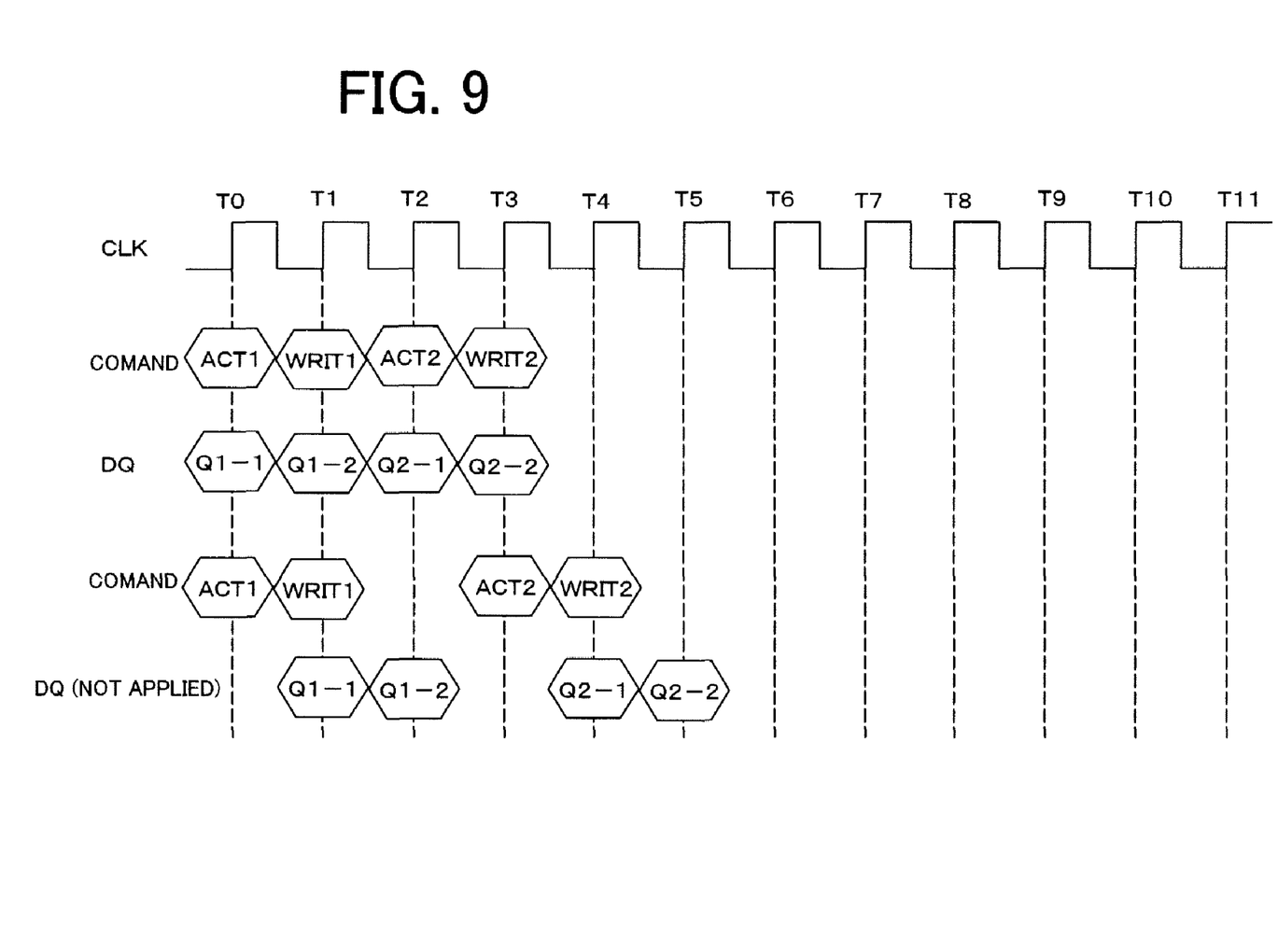
FIG. 9 is a drawing showing the operation timing by an ACT instruction with data.

Furthermore, FIG. 9 is a drawing showing the operation timing from an ACT instruction with data. Here as well, the case in which the burst length is 2 is shown. With the memory-control device of this example, it is possible to output data at the same time as the ACT instruction (ACT instruction with data) (Q1-1 for ACT1). Data continuously flows into each of the data buffers 22, and data is stored only when there is a write instruction for its own rank, and the write instruction is executed. On the other hand, with a conventional memory-control device, write data begins to be output when the write instruction is issued, and the next instruction is not received during DQ output, so a gap occurs.

With the construction described above, the case in which an existing DRAM chip is used and an external rank-management unit 20 is mounted on the memory module is assumed. If as an optional function, functions were mounted on a memory chip, it would then be possible to mount the rank-management unit 20 as is onto the memory chip and all of the ranks connected in a stub connection could operate independently. In this case, it is not necessary to make large circuit modifications, and since there is an on-chip sub memory bus, this contributes to a decrease in latency, increase in speed, decrease in cost, decrease in power consumption and generated heat that accompanies it, and a decrease in failure rate.

Also, it is possible to combine with bandwidth improvement technology (for example, creating a multi-channel memory bus) for other memory access.

Furthermore, the effect still exists even when the example is changed, such as mounting the rank-management unit 20 on the memory chip. It is also possible to change the main memory busses 52a, 52b or sub-memory busses 53a, 53b to have different bus architecture or protocol (including speed, ratings). Particularly, in the case of point-to-point connection, it is possible to set faster access timing than in the conventional art, which is preferable.

As described above, with the memory-control device of this invention, it is possible to suppress a drop in transfer rate of the memory bus due to address selection, refresh and latency, and thus it is possible to utilize bandwidth more effectively and improve the effective speed. Also, in read access for a continuing address, it is possible to suppress a drop in memory access speed when the RAS is changed. Moreover, it is possible to provide an inexpensive means for using a general-purpose DRAM chip and improving speed, maintaining electrical and logical compatibility of the memory bus. In other words, it is possible to execute different instructions in parallel for a plurality of ranks and memory modules, and to avoid collisions between input/output data by simple arbitration.

This invention can be applied to uses that require memory bus bandwidth such as high-performance computers, and particularly notebook PCs or mobile terminals in which saving space is desired, blade servers, etc.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A memory-control device that is located between a processor and a plurality of memory ranks and that controls access to the memory ranks, comprising:
 a memory-management unit that receives and buffers an access request from the processor to any of the memory ranks, and issues an access request based on scheduling for memory management; and
 a rank-management unit that connects the plurality of ranks, receives and buffers said access request from said memory-management unit, and gives said access request to any one concerned of the memory ranks based on scheduling for rank management;
wherein said memory-management unit comprises:
a first counter that performs counting for a data bus that is connected with said rank-management unit, and counts the time from occupation start of said data bus used for execution of said access request to end of the occupation; and
a first controller that performs said scheduling for memory management according to contents of said first counter; and
wherein said rank-management unit comprises:
a second counter that counts the time from occupation start of said data bus used for execution of said access request to end of the occupation; and
a second controller that performs said scheduling for rank management according to contents of said second counter.

2. The memory-control apparatus of claim 1 wherein
said memory-management unit further comprises a command encoder that corresponds to each or said plurality of memory ranks, said command encoder executing said access request by identifying the access request for a memory rank concerned by a chip-selection signal; and
said second controller determines timing for data input/output for a memory rank concerned by finding an available timing of said data bus through counting, by said second counter, the number of clocks that correspond to the time from occupation start of said data bus used for executing an instruction to end of the occupation said instruction being directed to ones other than said memory rank concerned.

3. The memory-control device of claim 1 wherein
said memory-management unit further comprises a third counter that counts the time during which each of the memory ranks of said plurality of memory ranks is busy; and
said first controller performs said scheduling for memory management according to contents of the third counter.

4. The memory-control device of claim 1 wherein
said rank-management unit comprises a fourth counter that counts the time during which any of the memory ranks connected to said rank-management unit is busy; and
said second controller performs said scheduling for rank management according to contents of the fourth counter.

5. The memory-control device of claim 1 wherein
said memory-management unit further comprises an address-conversion table for re-arranging the order of serial access in the address space of said processor so that interleave access of said plurality of memory ranks is performed.

6. The memory-control device of claim 1 wherein
said rank-management unit further comprises a data buffer that stores burst data of which a length of at least one word has been added to the word length when performing multi-word burst access, and when an instruction that corresponds to multi-word burst comes from said memory-management unit, the extra one-word portion is pre-fetched to said data buffer.

7. The memory-control device of claim 6 wherein
said rank-management unit pre-fetches one-word length of burst data from the first CAS (Column Address Strobe) address that follows a next continuing RAS (Row Address Strobe) address when a read instruction comes to read the last CAS address of the same RAS.

8. The memory-control device of claim 6 wherein
said rank-management unit outputs data that was pre-read with no wait to the data bus and executes receiving a next command when the pre-read data pre-fetched to said data buffer hit the address of the next read instruction, and discards the pre-read data when pre-read data that was pre-fetched in the command buffer miss-hit a next read instruction.

9. The memory-control device or claim 1 wherein said memory-management unit further comprises:
  an access-request segregator that segregates an instruction from said processor into a read instruction and a write instruction;
  a read-request buffer that buffers said segregated read instruction; and
  a write-request buffer that buffers said segregated write instruction; and
  when said read instruction and said write instruction are buffered in respective said read-access buffer and said write-request buffer, gives priority to issue a read instruction to said rank-management unit.

10. The memory-control device of claim 7 wherein
said rank-management unit transfers a write instruction for rank memory that is connected to said rank-management unit and data related to said write instruction to a decoder buffer and data buffer, respectively, while the rank memory that is an object of said read instruction is being read, and executes that write instruction when the rank memory that is the object of that write instruction differs from the rank memory that is the object of said read instruction.

11. The memory-control device of claim 1 wherein
said memory-management unit receives a write instruction from said processor at the same time as write data related to that write instruction.

12. The memory-control device of claim 1 wherein
said rank-management unit performs a refresh operation of a rank memory at timing when said data bus is busy with communication with a rank memory other than that rank memory.

* * * * *